United States Patent [19]
Kent

[11] 3,774,444
[45] Nov. 27, 1973

[54] SYSTEM FOR DETERMINING SONIC VELOCITY IN SOLID MATERIALS

[75] Inventors: James T. Kent, Cincinnati, Ohio

[73] Assignee: Magnaflux Corporation, Chicago, Ill.

[22] Filed: June 1, 1971

[21] Appl. No.: 148,426

[52] U.S. Cl. ............................. 73/67.6, 73/67.8 R
[51] Int. Cl. ........................................ G01n 29/00
[58] Field of Search ................... 73/67.9, 67.5–67.8, 73/67.2, 71.5 U

[56] References Cited
UNITED STATES PATENTS

| | | | |
|---|---|---|---|
| 3,220,249 | 11/1965 | Posakony | 73/67.8 X |
| 3,153,928 | 10/1964 | Uphoff et al. | 73/67.8 |
| 3,504,532 | 4/1970 | Muenow et al. | 73/67.7 |
| 3,603,136 | 9/1971 | Diamond et al. | 73/67.8 |

FOREIGN PATENTS OR APPLICATIONS

| | | | |
|---|---|---|---|
| 219,853 | 5/1969 | U.S.S.R. | 73/67.6 |
| 143,589 | 4/1961 | U.S.S.R. | 73/67.5 R |

Primary Examiner—James J. Gill
Attorney—Van Metre Lund

[57] ABSTRACT

System for determining the sonic velocity and related characteristics of a sample of solid material such as malleable or ductile iron. A portable hand-carried unit has means engagable with opposite surface portions of a sample, sensing means for developing an electrical characteristic which varies as a function of the distance between the engagement means and ultrasonic transducer means for transmitting waves through the sample from one surface portion to the other and back again. The variable electrical characteristic and the time of transmission of the waves through the sample are compared by electrical measuring means.

8 Claims, 6 Drawing Figures

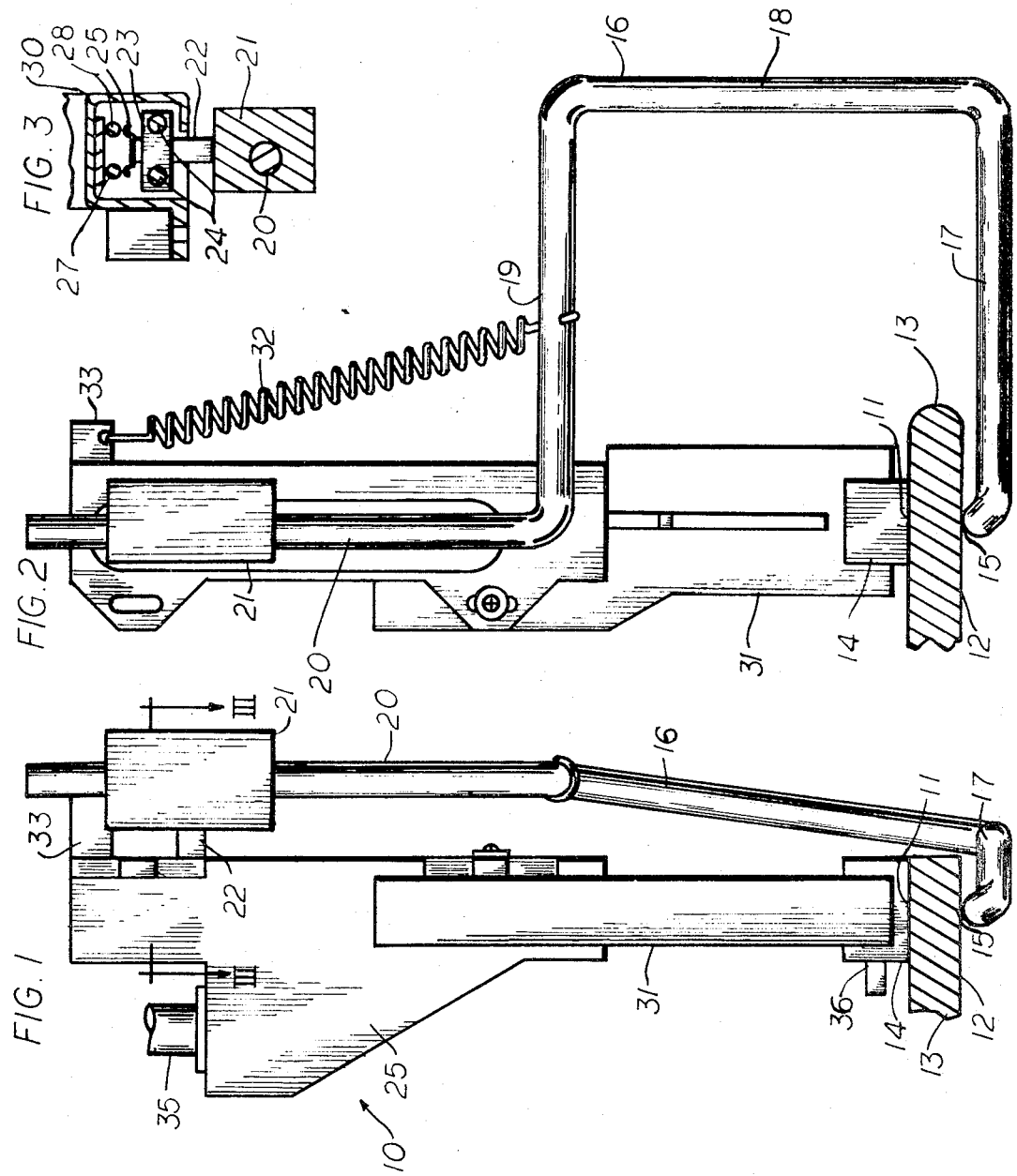

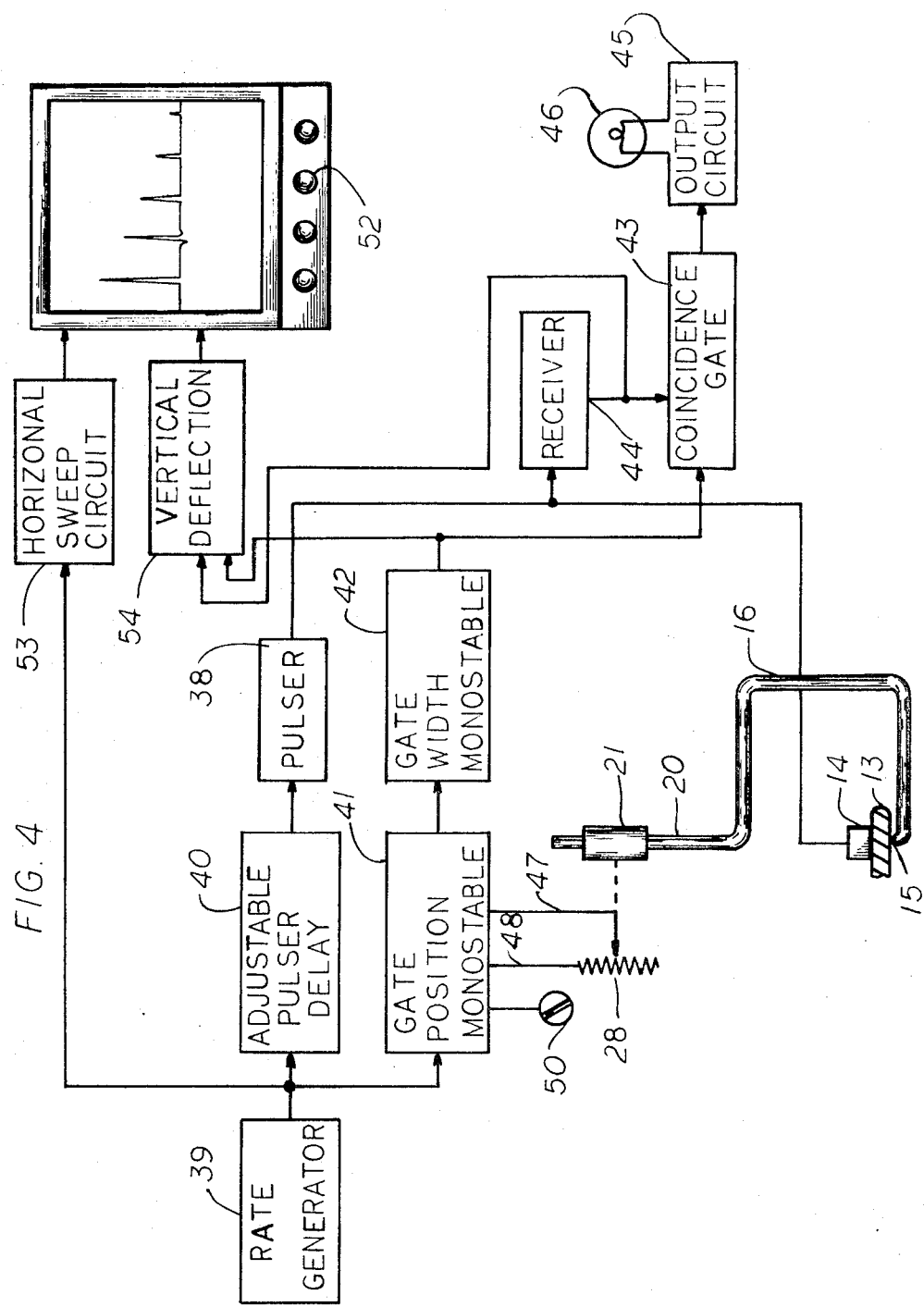

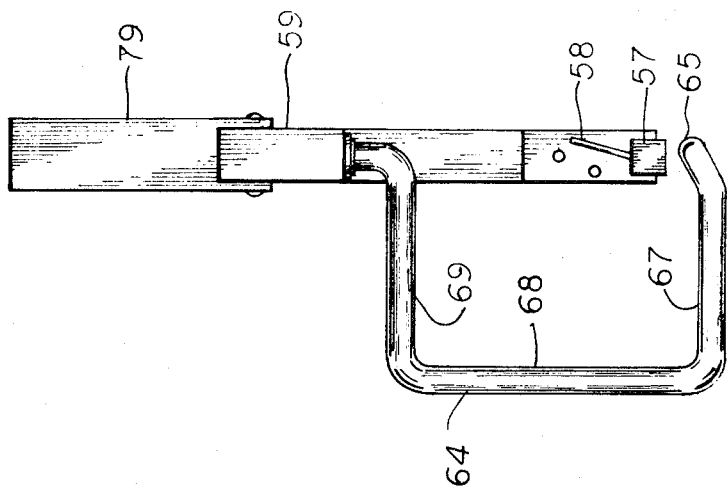
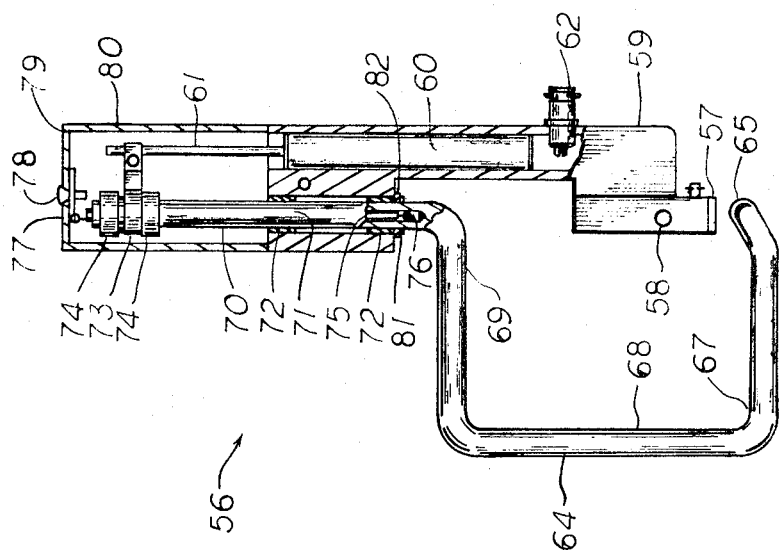

SYSTEM FOR DETERMINING SONIC VELOCITY IN SOLID MATERIALS

This invention relates to a system for measuring characteristics of a sample of solid material and more particularly to a system for measuring sonic velocity and characteristics related to sonic velocity. The system of this invention is highly accurate and reliable and permits measurements to be readily, quickly and conveniently made of castings, forgings or other parts of irregular configuration and non-uniform dimensions.

Although having a variety of applications, the system of this invention was particularly designed for the measurement of nodularity of malleable and ductile iron parts. Malleable and ductile iron have approximately the same structure and strength and in both materials the graphite shape determines the strength and fatigue properties. In malleable iron, the graphite shape (nodular) is obtained by heat-treat and quench while the graphite shape in ductile iron is obtained by innoculation of the melt with magnesium. In both cases, flake graphite instead of nodular graphite results in a part with low strength and low fatigue life, about the same as gray iron.

Both foundries and users of malleable and ductile iron castings have spent a great deal of research trying to find a reliable method of determining the graphite shape. It has been found that sonic velocity is a function of nodularity and systems have been proposed for measuring sonic velocity for this purpose. In one such system, a casting or other part is physically measured with a gauge to establish a standard thickness of section, the place where the standard thickness exists being marked with chalk or crayon. A couplant is applied and a standard pulse ultrasound instrument is used in a thickness measuring mode using one back reflection on an expanded trace. If the pattern shifts to the right an established amount, the casting is rejected. Accurate results can be obtained with this system, but is requires considerable care and the exercise of good judgement on the part of the operator and each measurement is a time-consuming operation.

Another such system involves the immersion of a casting or other part between two transducers positioned a fixed distance apart, the sound paths to the casting from the two transducers being added together with the sum being subtracted from the total path to determine the thickness. An ultrasonic thickness measurement is also developed from one of the transducers and is compared with the calculated two thickness. This system requires a computer, a triple display and two digital read-outs with all of the inherent troublesome complexities. It is adversely affected by any angularity in the positioning of the casting, the temperature of the water and other variables and it has various mechanical problems.

This invention was evolved with the general object of overcoming the disadvantages of prior proposed systems and of providing a comparatively simple and yet accurate and reliable system with which sonic velocity can be easily and rapidly determined.

According to this invention, opposite surface portions of a part are engaged by engagement means connected to sensing means to develop a variable electrical characteristic which is compared, by electrical measuring means, with the time of transmission of ultrasonic energy from one of the surface portions to the other. The measuring means may, for example, supply an indication of velocity which is a function of the distance between the opposite surface portions divided by the time of travel of the ultrasonic energy. The velocity indication may be used directly or to indicate characteristics related to velocity, such as nodularity of malleable or ductile iron.

In accordance with the principles of the invention, a through transmission mode of operation may be used with the ultrasonic energy being transmitted into one surface portion and received at the opposite surface portion. In the alternative, a reflection mode may be used in which ultrasonic energy may be transmitted into one surface portion and received back at the same surface portion after reflection from the opposite surface portion. The reflection mode has advantages including the fact that a single transducer means can be used, either a single transmitting-receiving transducer or a unit including separate transmitting and receiving transducers in side-by-side relation.

In the reflection mode, a resonance method may be used in which the time is measured by determining a frequency at which the energy comes back in phase with the transmitted energy to thereby determine the transmission time, which is directly proportional to the thickness. In the alternative, a pulse-echo method may be used in which a short burst of ultrasonic energy is transmitted into one surface portion and in which the time of reception of a certain reflection is measured, either the first or a subsequent reflection back from the opposite surface portion. The pulse-echo method generally has the advantages of permitting more rapid, direct and accurate measurements. In a preferred embodiment, described hereinafter, the reflection mode and pulse-echo method are used, most preferably with a single transducer operative to both transmit and receive.

According to a specific feature of the invention, a direct contact is used between the transducer means and the part, preferably with the transducer means also serving as an engagement means to thus serve a dual function.

In a system according to the invention, the engagement and transducer means may be supported from a table or other fixed support and the part may be moved by hand or automatically to a position for engagement by the engagement means. In the alternative, the engagement and transducer means may be supported on a movable support means. In a preferred embodiment, described hereinafter, the engagement and transducer means are supported on a movable support in a manner to form a compact portable unit which may be supported by one hand of the user.

The invention has other features including features of physical construction and electronic circuit features, including the provision of means for indicating when the velocity is less than or greater than a predetermined value.

This invention contemplates other objects, features and advantages which willbecome more fully apparent from the following detailed description taken in conjunction with the accompanying drawings which illustrate preferred embodiments and in which:

FIG. 1 is a front elevational view of a velocity measuring unit constructed in accordance with the principles of this invention;

FIG. 2 is a side elevational view of the unit of FIG. 1;

FIG. 3 is a cross-sectional view taken substantially along line III—III of FIG. 1;

FIG. 4 is a schematic block diagram of electrical circuitry for connection to the measuring unit of FIGS. 1—3;

FIG. 5 is an elevational view, partly in section, illustrating a modified form of measuring unit according to the invention; and FIG. 6 is an end elevational view of the device of FIG. 5 showing a spindle thereof rotated 90° from its position in FIG. 5.

Reference numeral 10 generally designates a sonic velocity measuring unit constructed in accordance with the principles of this invention. The unit 10 is shown in use in measuring the velocity of travel of ultrasonic energy between opposite surface portions 11 and 12 of a part 13 which may be a ductile iron casting, for example. Surface portion 11 is engaged by the face of an ultrasonic transducer 14, defining an anvil or engagement means. The opposite surface portion 12 is engaged by the rounded terminal end 15 of a spindle member 16, end 15 being in alignment with the axis of the transducer 14 and defining a second engagement means.

The rounded end 15 is at the end of a portion 17 extending outwardly in a direction transverse to the axis of the transducer 14, a portion 18 extending from the outer end of the portion 17 to the outer end of another portion 19, generally transverse to the axis of the transducer 14, and a portion 20 extending from the inner end of the portion 19 in a direction generally parallel to the axis of the transducer. Portion 20 is fixedly carried by a block 21 which is fixedly connected through a rod 22 to a block 23 which is slidably supported on a pair of rods 24 of a variable resistance unit generally designated by reference numeral 25. Rods 24 have axes parallel to each other and to the axis of the transducer 14. The block 23 carries a contact element 25 which is in sliding engagement with a conductor 27 and a resistance element 28 insulatingly supported within a housing 30 of the unit 25. Conductor 27 and resistance element 28 are on axes parallel to the axes of the rods 24. With movement of the spindle element, the resistance between conductors 27 and one end of the resistance element 28 varies, preferably in a linear fashion.

The housing 30 of the unit 25 is secured to a support block 31 which fixedly carries the transducer 14. A coiled compression spring 32 is provided between the portion 19 of the spindle 16 and a bracket 33 affixed to the housing 30, to urge the spindle 16 in a direction such as to urge the end 15 toward the transducer 14.

In operation, the spindle 16 may be moved to permit positioning of the transducer 14 and spindle end 15 on opposite sides of the part after which the spindle 16 may be allowed to return under the urging of the spring 32 to a position as illustrated in which the surface 11 is firmly engaged with the transducer 14 and the end 15 is firmly engaged with the surface portion 12. A coupling fluid may be used between the face of the transducer 14 and the surface portion 11 for efficient coupling of the ultrasonic energy, particularly with parts having a rough surface.

With the part 13 so positioned, as illustrated, the resistance between the conductor 27 and one end of the resistance element 28 provides an indication of the distance between the surface portions 11 and 12. It will be appreciated that other types of sensing means may be used having electrical characteristics which vary as a function of distance, such as, for example, sensing devices which provide a variable capacitance, inductance, voltage, current or other characteristic which varies as a function of distance. The illustrated unit 25 is a type of unit known in the art as a linear potentiometer unit and has advantages, particularly in an electrical circuit arrangement as illustrated in FIG. 4. Electrical connections are made to the conductor 27 and resistance element 28 through a cable connection 35 and electrical connections are made to the transducer 14 through a cable connection 36.

Referring to FIG. 4, the transducer 14 is connected to the output of a pulser which is periodically operated by a signal applied from a rate generator 39 through an adjustable pulser delay 40. The rate generator 39 determines how often the circuit goes through an operating cycle, and typically operates beteen 100 Hz and a few thousand Hz.. Each pulse from the rate generator 39 initiates operation of the adjustable pulser delay circuit 40 which after a certain delay operates the pulser 38 to apply an electronic pulse to the transducer 14 which then transmits a burst of ultrasonic energy into the surface portion 11 of the part 13.

Each pulse from the rate generator 39 is applied to a gate position monostable multivibrator 41 which, after a certain delay, applies a signal to a gate width monostable multivibrator 42 to generate a gate signal having a certain duration. The gate signal is applied to one input of a coincidence gate circuit 43 having a second input connected to the output of a receiver 44 the input of which is connected to the transducer 14. The output of the coincidence gate circuit 43 is applied to an output circuit 45 which may operate suitable signals means, a signal lamp 46 being illustrated.

The delay obtained through the operation of the gate position monostable multivibrator 41 is so controlled as to be proportional to the thickness of the part, i.e. the distance between the face of the transducer 14 and the rounded end 15 of the spindle 16. For this purpose, the resistance means, provided by the unit 25, is connected to the gate position monostable multivibrator 41 through lines 47 and 48. Thus, line 47 may be connected to the conductor 27 and line 48 to one end of the resistance element 28. It will be understood that the variable resistance may be connected, for example, in series, in an RC timing circuit of the multivibrator 41. The multivibrator 41 preferably has a variable resistance or other element controllable from an adjustment screw 50, as diagrammatically illustrated, which controls the ratio between a change in resistance between lines 47 and 48 and the duration of the delay time. This control may be termed a "microsecond per ohm" control.

Normally, the system may be set up in a manner such that the leading edge of the first back reflection signal, i.e. the signal corresponding to the first echo received by the transducer at the surface portion 11 after transmission of the burst of energy into the surface portion 11, occurs within the gate period if the sonic velocity in the part is faster than a predetermined velocity, and the leading edge will be after the gate period if the velocity is slower than the marginal velocity. This is desirable because the leading edge is less sensitive to the strength of the reflected signal and also has a shorter rise time than the trailing edge of the reflected signal.

Thus, if the sonic velocity in the part is within a comparatively narrow range, the range being determined by the duration of the operation of the monostable multivibrator 42, the signal device 46 will be energized. If the thickness of the part is increased or decreased, there is no effect on the operation so long as the sonic velocity is the same since the delay produced by the multivibrator 41 is proportional to thickness.

The illustrated system further includes an oscilloscope 52 having a horizontal sweep circuit 53 triggered by pulses from the rate generator 39 and having a vertical deflection circuit 54 coupled to the output of the receiver 44 and also the output of the gate width monostable mulivibrator 42. Output signals from the receiver 44 may produce an upward deflection of the spot on the screen of the oscilloscope while an output signal from the multivibrator 42 may produce a downward deflection. Thus, the timing of reflection signals may be visually compared with the timing of the gate. In the illustration, the lefthand "pip" is the transmitted pulse while the first "pip" to the right is the first back reflection, aligned with the gate signal.

It will be understood that the oscilloscope arrangement may be used alone or the coincidence gate and output circuit combination may be used alone, or both may be used in combination. The system may be set up to determine whether parts meet prescribed standards with respect to sonic velocity, the satisfactory or unsatisfactory nature of a part being determined by observing the signal lamp 46 or the oscilloscope screen. The output circuit may be used to operate automatic marking or ejection apparatus.

The system may also be used to determine the velocity in a given part. Thus, control 50 may be calibrated in velocity units or the equivalent and may be adjusted until an indication is obtained from the output circuit 45 or until the gate and the pip are aligned on the oscilloscope screen. The position of adjustment of the control 50 then indicates the velocity of travel of the ultrasonic energy in the part.

FIG. 5 illustrates a modified form of measuring device, generally indicated by reference numeral 56. The device 56 comprises a transducer 57 which is supported by a holder 58 mounted on a body 59, which supports therewithin a linear potentiometer 60 having an actuating rod 61 projecting therefrom. Electrical connections are made to the potentiometer 60 through a suitable cable connector 62.

A spindle 64 is provided having a rounded terminal end 65 aligned with the axis of transducer 57 and having portions 67, 68, 69 and 70 similar to the portions 17, 18, 19 and 20 of the spindle 16 in the device 10. The portion 70 is journalled in a passage 71 in the body 59, parallel to the potentiometer 60, by means of suitable bearings 72. An arm 73 is held on the portion 70, between two collars 74, and is fixedly connected to the rod 61 of the potentiometer 60. The spindle 64 is urged upwardly by means of a tension spring 75 disposed within the portion 70, which is hollow for this purpose, the lower end of the spring 75 being connected to a pin 76, and the upper end thereof being connected to a plate 77 which is secured by a screw 78 to an upper wall 79 of a cap 80 secured to the body 59. A washer 81 and an O-ring 82 are disposed on the spindle portion 70 between the pin 76 and a downwardly facing surface portion of the body 59, to resiliently limit upward movement of the spindle 64 and to protect the transducer 57 from engagement by the spindle end 65.

It will be appreciated that the operation of the device 56 is substantially the same as that of the device 10. One advantage of the device 56 is that the spindle may be rotated if required during use. Another advantage is that the spindle is more securely supported, being supported directly from the main body of the device, rather than from a movable slide of a potentiometer unit, as is the case in the device of FIGS. 1–3. Both devices are portable and may be held in one hand during operation. It is noted that in both devices, it is desirable to hold them close to the transducer, which allows a more sensitive feel as to the engagement of the transducer face with the surface portion of the part. With both devices, it is possible to inspect parts very quickly and with a high degree of accuracy and reliability.

It will be understood that modifications and variations may be effected without departing from the spirit and scope of the novel concepts of this invention.

I claim as my invention:

1. In a system for determining characteristics of a sample of solid material, first and second support means, first and second engagement means on said first and second support means, connection means connecting said first and second support means for movement relative to each other and to move said first and second engagement means toward each other and into engagement with opposite surface portions of a sample, ultrasonic transducer means carried by at least one of said support means for transmitting a burst of ultrasonic energy into one of said surface portions and for developing a received signal after transmission of said burst from said one of said surface portions to the other of said surface portions, delay means operated in timed relation to the transmission of said bursts to develop an output signal after a controllable time delay, means for sensing relative movement of said first and second support means and connected to said delay means to control said controllable time delay in proportion to the distance between said first and second engagement means, and comparison means for determining coincidence between said output signal from said delay means and said received signal from said transducer means.

2. In a system as defined in claim 1, adjustment means associated with said delay means for controlling the ratio between said controllable time delay and the distance between said first and second engagement means.

3. In a system as defined in claim 1, said connection means comprising means supporting said second support means on said first support means for rectilinear movement relative thereto, and said sensing means comprising a resistance element carried be one of said support means and a slider contact carried by the other of said support means and movable along said resistance element in response to relative rectilinear movement of said second support means on said first support means.

4. In a system as defined in claim 3, said first support means being adapted to be held in one hand to position said engagement means on opposite sides of a sample, and spring means acting between said first and second support means to urge said second engagement means toward said first engagement means and to engage said engagement means with said opposite surface portions of the sample.

5. In a system as defined in claim 1, said comparison means comprising an oscilloscope having a pair of deflection means, sweep circuit means connected to one of said deflection means and operated in synchronism with the transmission of bursts into the sample, and means for applying received signals from said transducer means and output signals from said delay means to the other of said deflection means.

6. In a system as defined in claim 1, said comparison means comprising a coincidence gate circuit responsive to said output signal from said delay means and said received signal from said transducer means.

7. In a system as defined in claim 1, said delay means comprising a first circuit for developing a trigger signal after a controllable time delay, and a second circuit responsive to said trigger signal to develop an output signal in the form of a pulse having a predetermined time duration.

8. In a system as defined in claim 1, said transducer means comprising a sending-receiving transducer forming one of said engagement means and arranged to transmit bursts into the sample and to develop said received signal after reflection of said bursts from the surface portion engaged by the other of said engagement means.

* * * * *